June 2, 1964     L. E. LEVINSON     3,134,991
AMPHIBIOUS VEHICLES
Filed May 31, 1961     2 Sheets-Sheet 1
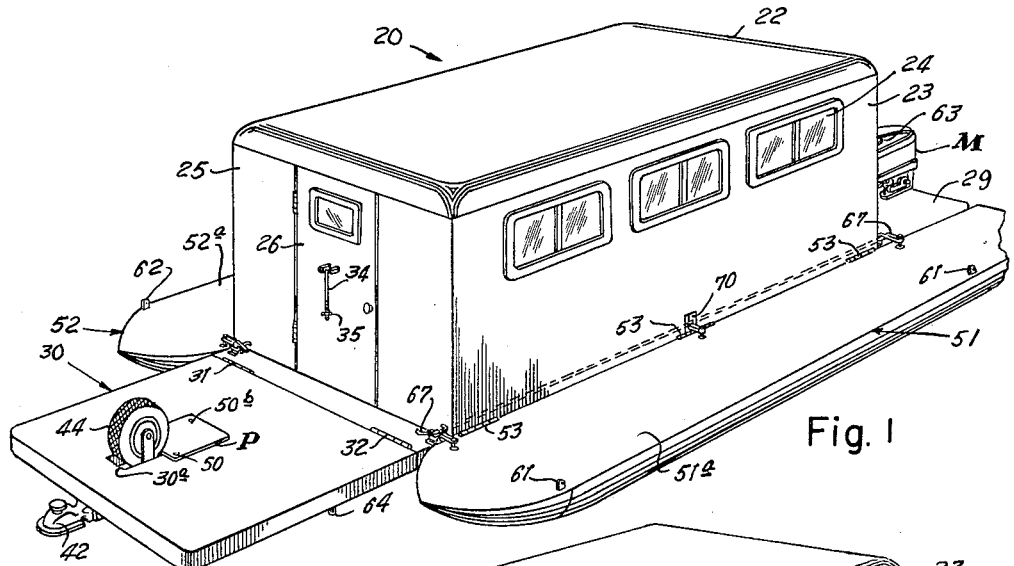
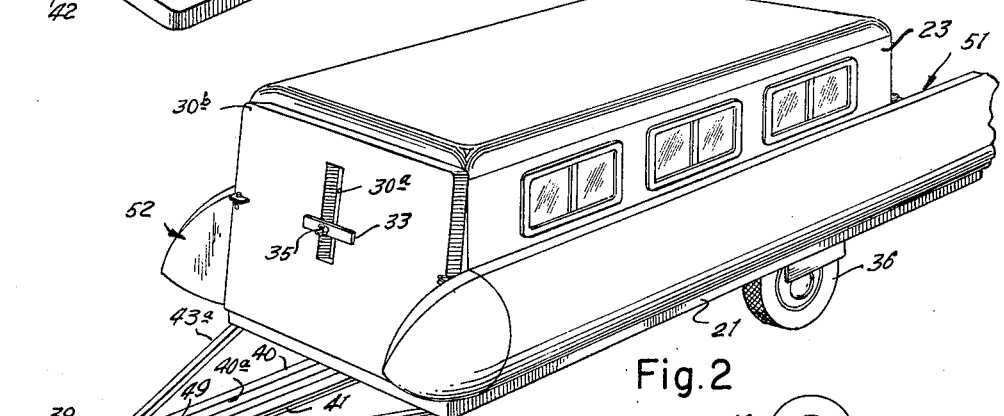
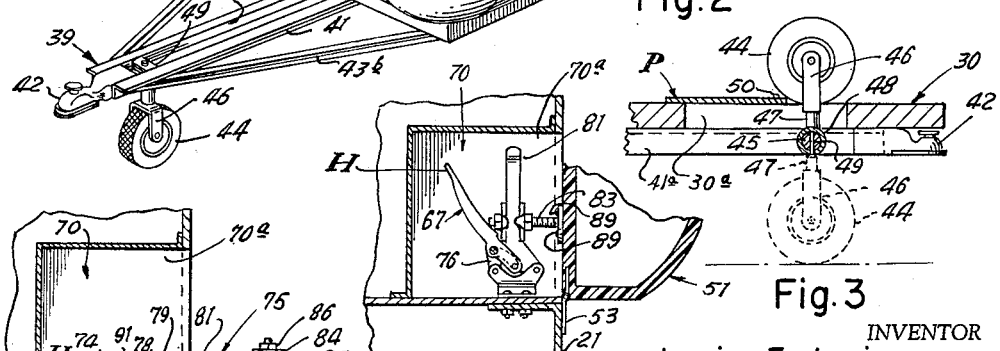
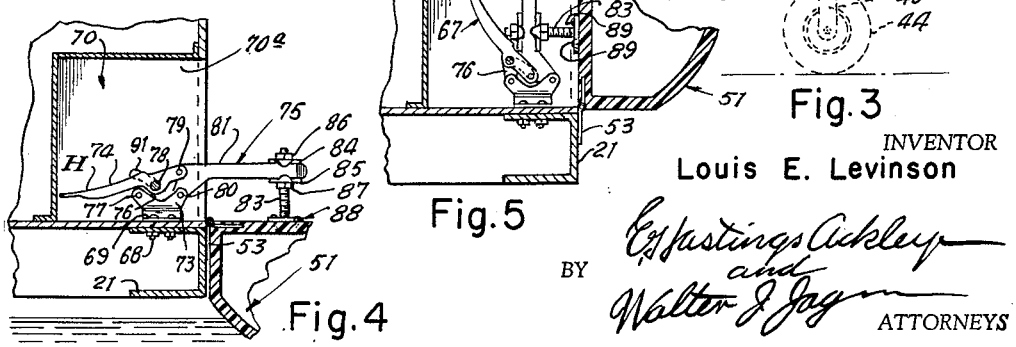
INVENTOR
Louis E. Levinson
BY *Hastings Ackley and Walter J. Jay*
ATTORNEYS June 2, 1964 L. E. LEVINSON 3,134,991
AMPHIBIOUS VEHICLES
Filed May 31, 1961 2 Sheets-Sheet 2

INVENTOR
Louis E. Levinson
BY C. Hastings Ackley
and
Walter J. Jagn
ATTORNEYS

United States Patent Office 3,134,991
Patented June 2, 1964

3,134,991
AMPHIBIOUS VEHICLES
Louis E. Levinson, 6458 Royal Lane, Dallas, Tex.
Filed May 31, 1961, Ser. No. 113,750
3 Claims. (Cl. 9—1)

This invention relates to vehicles, and more particularly to amphibious vehicles.

One object of this invention is to provide a new and improved amphibious vehicle.

Another object is to provide an amphibious vehicle which may be equipped with pontoons at its sides so that when disposed in a body of water, the bottom of the vehicle will normally be held out of contact with the surface of the water, thereby reducing the resistance offered by the water to the movement of the vehicle thereon.

Still another object is to provide an amphibious vehicle having pontoons which are mounted thereon for movement between an operational extended position wherein the pontoons extend at right angles to the sides of the vehicle and are adapted to support the vehicle when disposed in the water and a retracted inoperative position adjacent the sides of the vehicle.

A further object is to provide an amphibious vehicle having pontoons which are mountable in an operational extended position at the sides thereof whereby the stability of the vehicle when on water is increased and which are movable from said operational extended positions to retracted positions adjacent the sides of the vehicle to reduce the width of the vehicle within limits prescribed for travel on the highway.

A still further object is to provide an amphibious craft adaptable for use as a housetrailer or houseboat, which has retractable wheels and a deck panel that is swingable into position to provide a porch for the craft when on land, or a deck for the craft when in the water.

A still further object of the invention is to provide an amphibious vehicle of the housetrailer type which can be speedily and practically converted to a houseboat and which is equipped with pontoons at the sides thereof, whereby the upper surfaces of the pontoons are adapted to provide an additional deck area for the vehicle when the vehicle is used as a houseboat or additional porch area for the vehicle when used as a housetrailer.

A still further object is to provide an amphibious vehicle which is equipped with pontoons movably attached to the vehicle for movement between operative extended positions wherein the pontoons are adapted to support the body of the vehicle above the surface of a body of water when the vehicle is disposed therein and retracted positions wherein the width of the vehicle is reduced, the vehicle having a releasable locking means for locking the pontoons in their operative extended positions.

A still further object is to provide an amphibious vehicle having a set of retractable rear wheels and a draw bar and including a front wheel which is mounted on the draw bar and movable thereon between a position wherein the wheel is above the draw bar and a position wherein the wheel is suspended below the draw bar whereby in its lower position the front wheel is adapted to engage the shore or bank to facilitate the movement of the vehicle into and out of the water.

Additional objects and advantages of the invention will be readily apparent from the reading of the following description of a device constructed in accordance with the invention, and reference to the accompanying drawings thereof, wherein:

FIGURE 1 is a perspective view of the amphibious vehicle of the invention, showing the vehicle as it appears when afloat on a body of water;

FIGURE 2 is a perspective view of the amphibious vehicle of FIGURE 1, showing the vehicle as it appears when used as a housetrailer;

FIGURE 3 is a fragmentary detailed view of the front wheel assembly of the vehicle;

FIGURE 4 is a fragmentary sectional view of a locking device shown locking a pontoon in operational extended position at the side of the vehicle;

FIGURE 5 is a view similar to FIGURE 4 showing the disposition of the locking device when the pontoon is in an inoperative retracted position adjacent the side of the vehicle;

Figure 6:
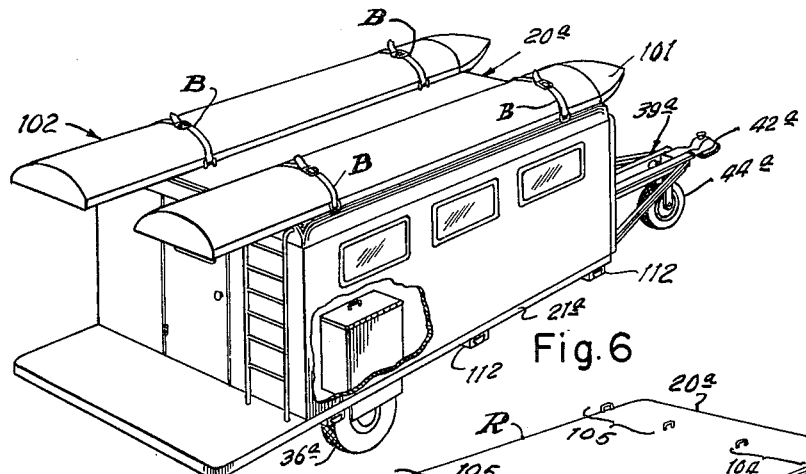
FIGURE 6 is a perspective view of a modified form of amphibious vehicle embodying the invention, with some parts broken away.

Referring particularly to FIGURES 1 and 2 of the drawings, the amphibious vehicle 20 embodying the invention comprises a rectangular platform or main deck 21 on which is mounted a cabin structure 22. The cabin is constructed with side walls 23 having windows 24, a front wall 25 which includes a door 26, and a rear wall (not shown) which is also preferably provided with a door. The cabin and deck may be constructed of any suitable material, such as aluminum, plastic, impregnated fiber glass, and the like.

An extension of the main deck rearwardly of the cabin provides an after deck 29 which serves as an open-air deck when the vehicle is afloat on a body of water or as a porch or platform when the vehicle is used as a housetrailer. An outboard motor M may be attached to the after deck to provide motive power for the vehicle if the vehicle is not provided with an inboard motor.

The vehicle is provided at its front end with a swingable deck platform 30. The deck platform is attached to the front end of the deck 21, which extends slightly forward of the cabin 20, by means of hinges 31 and 32 and is mounted for movement between a substantially vertical position wherein the free end of the deck platform is disposed against the front wall of the cabin and a lower position wherein the platform extends coplanar with the deck 21. When the vehicle is prepared for towing on the highways by a towing vehicle, the deck platform is positioned against the front wall of the cabin, as shown in FIGURE 2, and secured thereto by a toggle 33. A toggle arm 34, which secures the toggle 33 to the door 26, extends through a fore and aft slot 30a in the platform 30 and the toggle is disposed transversely across the slot against the outer surface 30b of the platform, as viewed in FIGURE 2. A wing nut 35 threaded on the free end of the toggle arm locks the toggle against the platform 30.

The vehicle is equipped with a set of wheels 36 disposed beneath the rear portion of the vehicle. The particular mode of suspension of the wheels (not disclosed) is preferably of a conventional type wherein the wheels may be retracted upwardly within accommodating housings or wells formed within the cabin structure. Although the wheels 35 may be left in their lowered positions when the vehicle is afloat, they are preferably raised to retracted position where they are entirely out of contact with the water.

A draw bar 39, comprised of a pair of elongate angle iron members 40 and 41 attached to the underside of the vehicle in spaced parallel relationship to one another, extends forwardly of the vehicle along the longitudinal central axis thereof and is provided at its forward end with a trailer hitch 42. A pair of braces 43a and 43b connect the forward ends of the draw bar members 40 and 41, respectively, with the forward edge surface of the main deck 21 at the corners thereof. The braces, in addition to providing support for the forward extension of the draw bar, also serve to support the swingable deck platform 30 when it is swung to its lowermost position coplanar with the main deck 21.

A front wheel 44 is pivotally mounted on a transverse cylindrical shaft member 45 which is welded or otherwise attached to the adjacent inner surfaces 40a and 41a of the angle iron members 40 and 41, respectively. The wheel 44 is positionable by pivotal movement about the shaft 45 between a position directly beneath the draw bar and a position directly above the bar as shown in FIGURE 3. When the vehicle is towed on the highways by means of the trailer hitch, or is used as a trailer house, the front wheel is held in a position above the bar. However, when launching the vehicle in a body of water or withdrawing the vehicle therefrom, the front wheel is secured in position beneath the draw bar where it is adapted to engage the ground or bank as the vehicle is moved into or out of the water.

The front wheel 44 is mounted between the legs of an inverted U-shaped frame 46 which is swivelled on a strut 47 for rotational movement relative thereto. The strut 47 is secured by welding or other suitable means to a cylindrical sleeve 48 disposed about the transverse shaft 45. The strut, which is disposed perpendicularly to the axis of the sleeve, is adapted to be pivoted or rotated with the sleeve about the shaft 45. When the vehicle is being launched or withdrawn from the water, the front wheel 44 is secured in position below the draw bar by a locking pin or bolt 49 which is inserted through aligned apertures in the sleeve and shaft, as shown in FIGURE 2. In this position, however, the wheel is free to rotate on its swivel mounting about the substantially vertical axis of the strut 47.

When preparing the vehicle for towing on the highways, the front wheel 44 is released from its position beneath the draw bar, by removing the pin or bolt 49 from the sleeve 48, and rotating the strut and sleeve by substantially one hundred eighty degrees about the shaft 45 to a position wherein the wheel is disposed above the bar, the wheel passing between the spaced angle iron members during its pivotal movement about the shaft. The wheel is maintained fore and aft in position above the draw bar, wherein it is adapted to pass through the slot 30a in the platform 30 when the platform is released and swung downwardly to lie flat against the draw bar and the braces 43a and 43b. A rectangular locking plate P, lying flat against the upper surface of the platform 30 and pivotally mounted thereon by means of a pivot pin 50 is adapted to be swung against the tread surface of the tire and locked in position thereagainst by means of a stop pin or bolt 50b inserted through aligned apertures in the platform 30 and the locking plate P. In this position of the locking plate, the tread surface of the tire also engages the platform 30 along the front edge of the slot 30a. Thus, the wheel, when held in position above the draw bar by means of the locking plate P, serves to lock the platform 30 in its lowermost position wherein it is coplanar with the main deck of the vehicle.

It will thus be apparent that the platform 30, when in its lowermost position, provides an additional deck area when the vehicle is used as a houseboat or a porch area when the vehicle is used as a housetrailer and is not being towed.

A pair of pontoons 51 and 52 having flat top surfaces 51a and 52a are attached to the side edges of the deck 21 by means of hinges 53 whereby the pontoons may be moved between a position wherein their flat surfaces are disposed adjacent the side walls of the cabin and a position wherein their flat surfaces are disposed coplanar with the top surface of the deck 21. The pontoons are preferably metal hulls filled with a buoyant plastic foam, but may be hollow. The bow ends of the pontoons are streamlined to reduce water resistance to movement of the hulls and therefore of the vehicle.

Ears 61 and 62 are attached to the top surfaces of the pontoons 51 and 52, respectively, adjacent the outer edges thereof and are provided with apertures which are adapted to align with apertures of the ears 63 and 64 attached to the back wall of the cabin and the surface 30b of the platform 30, respectively, when the pontoons are positioned with their flat surfaces disposed adjacent the side walls of the cabin. A suitable latching means such as a lock bolt, or the like, may be inserted through the aligned apertures of the ears to secure the pontoons in place against the side walls of the cabin as shown in FIGURE 2.

A plurality of locking devices 67 are provided for locking each pontoon in the extended position illustrated in FIGURE 1. These locking devices are secured to the top surface of the deck 21 adjacent the side edges thereof. The locking devices, each of which is adapted to be manipulated between a retracted position as shown in FIGURE 5 and a locking position as shown in FIGURE 4, are attached to the deck 21 by means of bolts 68 extending through the bases 69. The forward locking device for each pontoon is secured to the portion of the deck 21 which extends forward of the cabin and the after locking device is secured to the after deck 29, as shown in FIGURE 1. The third locking device for each pontoon is bolted to the deck 21 substantially midway of the cabin and is disposed in a recess 70 in the side wall of the cabin.

Each locking device 67 includes a lower rigid vertical post 73 extending upwardly from the base 69 and a handle and guide arms 74 and 75. The handle arm is connected to the post by a link 76 whose opposite ends are pivotally secured to the post and to the handle arm by pivots 77 and 78, respectively. The handle arm is pivotally connected to the guide arm by a pivot 79 and the guide arm is connected to the post by a pivot 80. The guide arm 75 has a straight guide portion 81 extending substantially perpendicular to the portion of the guide arm between the pivots 79 and 80. A bolt 83, inserted through a longitudinal slot in the guide portion 81 and extending perpendicularly thereto, is provided with slide plates 84 and 85 whereby the bolt is adapted to slide along the guide portion 81. The slide plates are provided with apertures for receiving the shank of the bolt therethrough and are loosely clamped for sliding movement along the guide portion by means of nuts 86 and 87, respectively. One end of the bolt 83 is provided with a lock plate 88 by means of which the bolt may be secured to the top surface of the pontoon by screws 89.

The handle arm 74 is provided with a handle portion H for manipulating the locking device between its retracted and operative locking positions. When the handle is in its uppermost position, as shown in FIGURE 5, the bolt 83 is disposed substantially horizontal and the pontoon is in the position where its top surface is disposed against the side of the cabin. When the handle is moved downwardly to the position shown in FIGURE 4, the bolt 83 is disposed substantially vertically and the pontoon is positioned at the side edge of the deck of the vehicle with its flat upper surface coplanar with the top surface of the deck. During the pivotal movement of the guide arm 75 between the retracted and locking positions of the locking device, the bolt 83 slides along the guide 81 although it is rigidly secured to the pontoon. The bolts 83 may be rigidly secured to the guide arm by tightening the nuts 86 and 87 when the pontoons are in their horizontal operative positions.

It will be noted that the guide arm 75 is at the limit of its downward movement when in the position illustrated in FIGURE 4 because of the engagement of the surface of the pontoon with the side of the deck. Any force acting on the guide arm 75, which would tend to move it upwardly in pivotal movement about the pivot 77, other than a force exerted thereon by clockwise pivotal movement of the handle arm 74, tends to move the pivot 78 further downwardly since the pivot 78 is disposed below the line through the pivots 77 and 79. Consequently, the pontoon is effectively locked in the position of FIGURE 4 when the locking devices are disposed in their locking position.

To release a locking device, an upward force is exerted on the handle H to cause the handle arm 74 to pivot in a clockwise manner about the pivot 78 while the link 76 pivots counterclockwise about the pivot 77. This movement of the handle arm causes the guide arm 75 to pivot upwardly in a counterclockwise manner about the pivot 80. Such upward movement of the guide arm moves the bolt 83 to an upper horizontal position, shown in FIGURE 5, and pivots the pontoon to its raised operative position. The nuts 86 and 87 are of course loosened to permit sliding movement of the bolt in the longitudinal slot of the guide portion 81.

It will thus be seen that by simultaneously manipulating all of the locking devices which are provided for a pontoon, the pontoon may be swung between the positions illustrated in FIGURES 1 and 2. To facilitate simultaneous movement of the locking devices, the pivots 78 of the locking devices on each side of the vehicle are formed of a single rod. Consequently, moving any one of the handles H of the locking devices will cause all three to be moved simultaneously. Arcuate slots 91 in the front and back walls of the cabin and the side panels 70a of the recess 70 permit movement of the pivots 78 of the locking devices on each on the required path.

It will thus be seen that when the pontoons 51 and 52 are locked in their lowermost positions, the vehicle is adapted to be used as a houseboat with the pontoons supporting the deck above the surface of the water, as shown in FIGURE 4, thus decreasing the resistance offered by the vehicle to movement through the water since only the pontoons are immersed in the water. Although the pontoons in their primary function are designed to float the vehicle when used as a houseboat, they may also serve as porches for the vehicle when it is put to use as a housetrailer.

Figure 7:
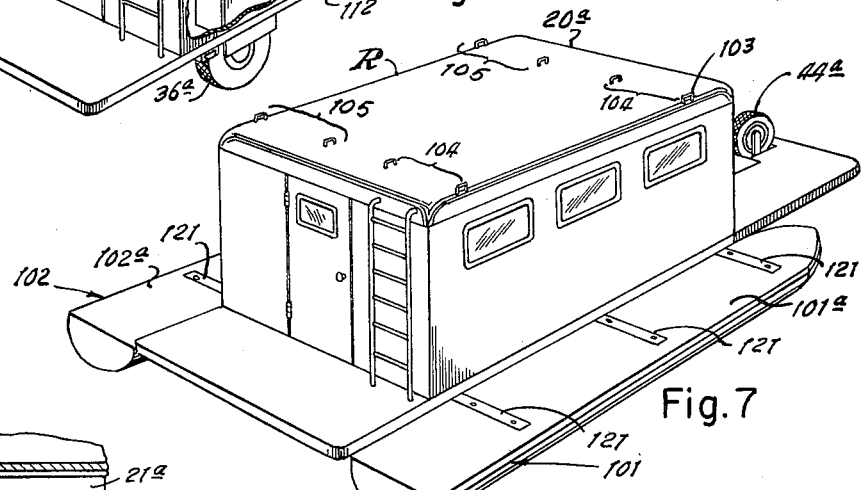
FIGURE 7 is a perspective view of the amphibious vehicle of FIGURE 6, showing the vehicle as it appears when afloat on a body of water.
Figure 9:
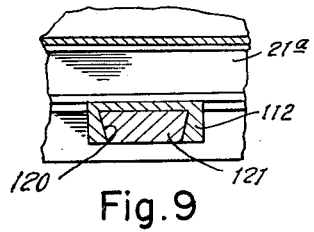
FIGURE 9 is a fragmentary sectional view taken along the line 9—9 of FIGURE 8.
Figure 10:
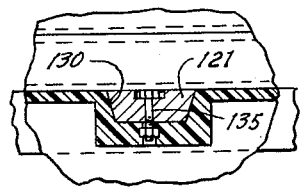
FIGURE 10 is a fragmentary sectional view taken along the line 10—10 of FIGURE 8.
Figure 8:
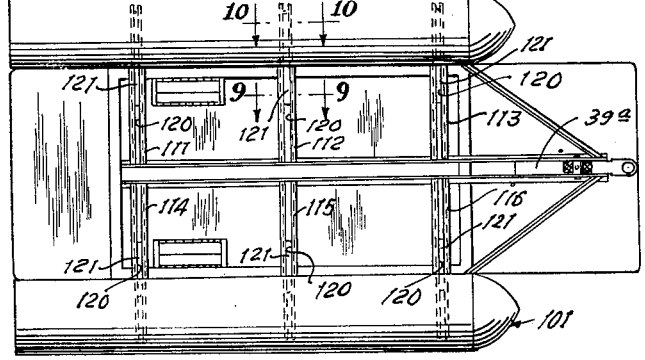
FIGURE 8 is a fragmentary bottom view of the amphibious vehicle of FIGURE 7.

A modified form of amphibious vehicle 20a embodying the invention and illustrated in FIGURES 6 to 8 is substantially identical to the amphibious vehicle 20 but is provided with a different type of mounting means for mounting the pontoons. Parts of the vehicle 20a which correspond to identical parts of the vehicle 20 are designated by the same reference number to which the subscript "a" has been added.

When the vehicle 20a is towed on the highways, the pontoons 101 and 102 are carried on the roof of the cabin in a fore and aft position thereon. The overall width of the vehicle 20a when the pontoons are on the roof is considerably less than that of the vehicle 20 when its pontoons are in retracted position, and thus is to be preferred where prescribed limits for widths of vehicles on the highways would bar the use of the vehicle 20 thereon.

The cabin roof of the vehicle 20a is provided with two transverse rows of strap hooks 103 which are aligned adjacent the fore and aft edges of the roof to form two pairs of hooks 104 and 105 in each row as shown in FIGURE 7. The hooks in each pair are sufficiently spaced from one another so that one of the pontoons may be carried fore and aft on the roof of the cabin between the hooks of each of the pairs 104 and the other pontoon may be similarly carried between the hooks of the pairs 105. Straps B are provided for each pair of hooks for lashing the pontoons securely to the roof of the cabin.

When it is desired to convert the vehicle to a houseboat, the pontoons are unstrapped and removed from the roof of the vehicle and secured to the deck 21a on the sides thereof as shown in FIGURES 7 and 8.

The mounting means for mounting the pontoons alongside the vehicle comprises a plurality of transverse guide members 111 to 116, which are fixed to the bottom of the deck 21a by welding or other suitable means. The transverse guide members 111, 112, and 113 extend transversely from the draw bar 39a along the central axis of the deck to one of the sides of the deck and the transverse guide members 114, 115 and 116 extend colinearly with the guide members 111, 112 and 113, respectively, to the other side of the deck. The guide members are provided with downwardly facing dove-tailed grooves 120 for receiving elongate slide members 121.

The slide members, which correspond in length to the guides in which they are received, are normally maintained in a retracted position within the guides when the pontoons are carried on the roof of the vehicle. However, for attaching the pontoons in operational position to float the vehicle, on water, the slide member in each guide is extended outwardly a predetermined distance beyond the outer end of its guide.

The pontoons are each provided with transverse grooves 130 in their flat upper surfaces 101a and 102a, which grooves are each adapted to receive a slide member 121 therein. The grooves 130 are spaced to align with the slide members which extend from one side of the vehicle so that a pontoon may then be attached to the slide members at one side of the vehicle by inserting the extended portions of the slide members in the grooves 130.

The grooves 130 may be formed directly in the top surface member of a pontoon or, if desired, may be formed in transverse frame members of the pontoons, which are welded or otherwise secured to the top surface member of the pontoon. Each of the slide members is secured in its groove in the pontoon by bolts 135 which extend through aligned apertures in the slide members and the top surface member of the pontoon. Similar means, not shown, may be provided for securing the slide members to the deck 21a when they are in their extended pontoon receiving positions and also when they are in their retracted positions in the guide members.

It will thus be seen that the vehicle 20a is substantially identical in all respects to the vehicle 20 of FIGURES 1 and 2 but differs solely therefrom in the means for mounting the pontoons on the vehicle.

It will be apparent that for either of the vehicles 20 or 20a to accord with highway and marine regulations, the vehicle structure may be provided with suitable lamps of proper indicating colors at the sides and the front and rear areas of the vehicle; also, if desired, other nautical devices, such as life rings, and the like, may also be carried on the vehicles in suitable locations thereon.

It will now be seen that an amphibious vehicle is disclosed herein which is adapted to be equipped with pontoons for supporting the vehicle above the surface of a body of water when the vehicle is disposed therein and which may be carried in a manner as to reduce the overall width of the vehicle when the vehicle is adapted for land travel.

It will also be apparent that the provision of pontoons which extend laterally outwardly of the cabin increases the stability of the houseboat in the water, since the center of gravity of the houseboat is disposed a substantial distance laterally inwardly of the pontoons.

It will also be seen that the amphibious vehicle disclosed herein is readily convertible from a housetrailer to a houseboat with a large deck area and pontoons for supporting the entire weight of the vehicle, the upper surfaces of the pontoons providing additional deck area for the boat.

The foregoing description of the invention is explanatory only, and changes in the details of the construction illustrated may be made by those skilled in the art, within the scope of the appended claims, without departing from the spirit of the invention.

I claim:

1. In an amphibious vehicle having a wheeled body portion: a deck; a cabin structure mounted on said deck; a draw bar attached to said deck and extending forwardly thereof; a front wheel pivotally mounted on said draw bar for movement between a lower position wherein said front wheel is directly below said draw bar and an upper position wherein said front wheel is directly above said draw bar; a platform hinged to the front end of said deck for movement between a first position wherein the front edge of said platform abuts the front wall of said cabin and a second position wherein said platform is supported by said draw bar in co-planar relation with said deck; and means for releasably securing said platform in said second position against said draw bar when said front wheel is in said upper position directly above said draw bar.

2. An amphibious vehicle having a set of rear wheels and including: a deck; a cabin structure mounted on said deck; means associated with said vehicle for rendering the vehicle buoyant and supporting the body portion of said vehicle above the surface of a body of water when the vehicle is disposed therein; a draw bar attached to said deck and extending forwardly thereof; a front wheel pivotally mounted on said draw bar for movement between a lower position wherein said front wheel is directly below said draw bar and an upper position wherein said front wheel is directly above said draw bar; a platform hinged to the front end of said deck for movement between a first position wherein the front edge of said platform abuts the front wall of said cabin structure and a second position wherein said platform is supported by said draw bar in co-planar relation with said deck; and means for releasably securing said platform in said first position against said cabin structure when said front wheel is in said upper position directly above said draw bar.

3. An amphibious vehicle having a wheeled body portion with retractable wheels including: a deck; a cabin structure mounted on said deck; a pair of pontoons; means for mounting one of said pontoons along one side of said deck and the other of said pontoons along the other side of said deck in fore and aft position thereon whereby said pontoons are adapted to support the body portion of said vehicle above the surface of a body of water when said vehicle is disposed therein; a draw bar attached to said deck and extending forwardly thereof; a front wheel pivotally mounted on said draw bar for movement between a lower position wherein said front wheel is directly below said draw bar and an upper position wherein said front wheel is directly above said draw bar; a platform; means connecting said platform to the front end of said deck for movement between a first position wherein the front edge of said platform abuts the front wall of said cabin structure and a second position wherein said platform is supported by said draw bar in co-planar relation with said deck; and means for releasably securing said platform in said second position when said front wheel is in said upper position directly above said draw bar.

References Cited in the file of this patent

UNITED STATES PATENTS

| | | |
|---|---|---|
| D. 192,541 | Copeland et al. | Apr. 3, 1962 |
| 1,683,276 | Woods | Sept. 4, 1928 |
| 2,567,684 | Tuckey | Sept. 11, 1951 |
| 2,711,259 | Jones | June 21, 1955 |
| 2,727,484 | White | Dec. 20, 1955 |
| 2,759,201 | McKinney | Aug. 21, 1956 |
| 2,818,188 | Hooten | Dec. 31, 1957 |

FOREIGN PATENTS

| | | |
|---|---|---|
| 318,048 | Great Britain | Aug. 29, 1929 |